Patented June 8, 1954

2,680,743

UNITED STATES PATENT OFFICE 2,680,743

SYNTHESIS OF PYRIDOXINE

Philip G. Stevens, Old Greenwich, Conn., assignor to General Aniline & Film Corporation, New York, N. Y., a corporation of Delaware No Drawing. Application February 6, 1951,
Serial No. 209,700

6 Claims. (Cl. 260—296)

This invention relates to a process for the preparation of pyridoxine (vitamin $B_6$) and intermediates therefor.

In accordance with this invention, 2-butanonediol-1,4 or an ether thereof, or 2-butynediol-1,4 or its ethers, which yield the aforesaid 2-butanonediol-1,4 and its ethers on hydration, is condensed with α-methyliminopropionitrile or its tautomer, α-methyleneaminopropionitrile, or a compound such as α-methylolaminopropionitrile which yields α-methyleneaminopropionitrile on dehydration, whereby there is formed 2-methyl-3-amino-4,5 - dimethylolpyridine or an ether thereof such as the mono- or dimethyl ether, or the corresponding 4,5-epoxydimethyl derivative, said ethers yielding pyridoxine after diazotization and replacement of the amino group by hydroxyl, and thence by hydrolysis in accordance with known methods.

The intermediate 2-butynediol-1,4 is obtained by condensing formaldehyde with acetylene. Upon hydration of this acetylenic glycol in the presence of a mercuric salt, 2-butanonediol-1,4 is obtained, which, under dehydrating conditions, forms 3-ketotetrahydrofuran (i. e., a cyclic diether of 2-butanonediol-1,4 is obtained); 3-ketotetrahydrofuran can also be obtained from 2-butanonediol-1,4 by hydrogenating the latter to butanetriol, dehydrating this to 3-hydroxytetrahydrofuran, followed by dehydrogenation. Mono- and diethers of 2-butanonediol-1,4 (e. g. the mono- and dimethyl ethers or other lower alkyl ethers) can be obtained by conventional methods from the free glycol. 2-butynediol-1,4 can be converted to the corresponding mono- or dimethyl ether by conventional methods. The latter ethers can be hydrolyzed in the presence of a mercuric salt to the corresponding ethers of 2-butanonediol-1,4. All of the aforesaid diols and their lower alkyl (e. g. methyl or ethyl) mono- and diethers, or the cyclic ether, can be used as intermediates for the synthesis of this invention.

The other intermediates for the present process can be obtained by mixing formaldehyde in aqueous or alcoholic solution with α-aminopropionitrile to form the corresponding α-methyleneamino- or α-methylolamino-propionitrile; or by condensation of pyruvic nitrile with methylamine at low temperature to form α-methyliminopropinonitrile.

In accordance with the preferred procedure of this invention, 3-ketotetrahydrofuran is condensed with α-methyliminopropionitrile to form 2 - methyl-3-amino-4,5-epoxydimethyl-pyridine, as illustrated by the following equations:

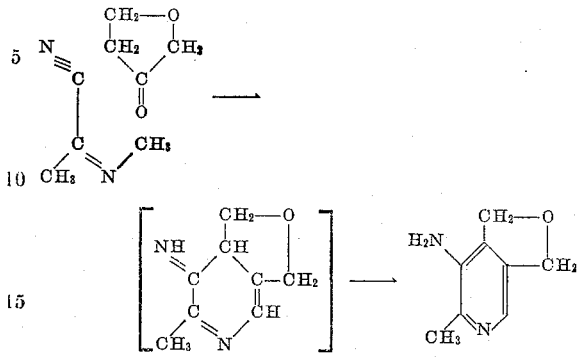

On diazotization of the resulting aminopyridine compound, and thermal decomposition of the resulting diazo derivative, 2-methyl-3-hydroxy - 4,5 - epoxydimethyl-pyridine is produced, in which the epoxydimethyl radical can be hydrolyzed, e. g. by conversion with hydrochloric or hydrobromic acid to chloromethyl or bromomethyl groups, and the latter hydrolyzed in aqueous alkali, to form pyridoxine (i. e., vitamin $B_6$ or 2-methyl-3-hydroxy-4,5-dimethylolpyridine).

In similar manner, 2-butanone-1,4-diol and its mono- and dialkyl ethers react with methyliminopropionitrile to form 2-methyl-3-amino-4,5-dimethylol-pyridine and its mono- and dialkyl ethers. The latter aminopyridine compounds, upon diazotization with nitrous acid and thermal decomposition of the resulting diazo group yield the corresponding 2-methyl-3-hydroxy-4,5-dimethylol-pyridine (pyridoxine), or alkyl ethers thereof, which can be readily hydrolyzed to pyridoxine. However, in the case of 2-methyl-3-amino-4,5-dimethylol-pyridine, it is advantageous to convert this compound to the corresponding cyclic ether (2-methyl-3-amino-4,5-epoxydimethyl-pyridine) by dehydration, before diazotizing and decomposition of the diazo radical, and then to hydrolyze resulting 2-methyl-3-hydroxy-4,5-epoxydimethylpyridine to pyridoxine, in order to facilitate recovery of the product in pure form.

Instead of α-methyliminopropionitrile, its tautomer, α - methyleneaminopropionitrile can be employed in the reactions described above. α-Methylolaminopropionitrile, which yields α-methyleneaminopropionitrile upon dehydration can also be employed in similar manner.

The process of this invention is illustrated in the following examples, wherein parts are by weight unless otherwise indicated.

*Example 1*

62 parts of α-methyliminopropionitrile (obtained by passing methylamine into pyruvic nitrile at room temperature) are mixed with 172 parts of 3-ketotetrahydrofuran, and 1 part of an amine salt such as piperidine acetate, or of an alkali metalamine compound such as lithium monoethylaniline. The mixture is agitated at 25 to 100° C. until condensation is substantially complete. The reaction mixture is poured into water and acidified with dilute sulfuric acid to a pH of 4 to 5. The resulting mixture, containing a sulfate of 2-methyl-3-amino-4,5-epoxy-dimethylpyridine in aqueous solution is extracted, preferably by continuous treatment, with a substantially water-insoluble organic solvent such as benzene, petroleum ether, chloroform or trichloroethylene, to remove unreacted 3-ketotetrahydrofuran and other neutral organic compounds. Upon evaporating the residual aqueous solution, the sulfate of 2-methyl-3-amino-4,5-epoxydimethyl-pyridine is obtained in solid form, and can be purified by recrystallization from aqueous alcohol solution.

As disclosed in my copending application Serial No. 202,404, filed December 22, 1950, the resulting product can be diazotized and the diazo compound converted to the corresponding hydroxyl compound by treatment with sodium nitrite in dilute aqueous sulfuric acid at about 90° C., and after destruction of excess nitrous acid by addition of urea, the solution is neutralized with caustic soda and water evaporated, whereby 2-methyl-3-hydroxy-4,5-epoxydimethyl-pyridine separates in the form of an oily layer. The evaporated residue is extracted with ether and the ether evaporated from the extract, whereby 2-methyl-3-hydroxy-4,5-epoxydimethyl-pyridine is obtained as a light colored oil. By heating this with hydrobromic acid, the aforesaid compound is converted to the corresponding 4,5-bromomethyl derivative, which, upon hydrolysis with aqueous alkali, yields 2-methyl-3-hydroxy-4,5-dimethylol-pyridine (pyridoxine).

*Example 2*

62 parts of α-methyliminopropionitrile are added to an aqueous solution of 172 parts of 2-butynediol-1,4 and sufficient mercuric acetate is added to effect hydration of the acetylenic alcohol to 2-butanone-1,4-diol. 1 part of piperidine acetate is added, and the mixture is allowed to react at 25 to 100° C. until condensation is substantially complete. The reaction mixture is acidified with dilute sulfuric acid to a pH of 4 to 5, and subjected to continuous extraction with a water-insoluble organic solvent as described in the preceding example, to remove neutral organic intermediates and byproducts. After filtering to remove mercury, the filtrate is boiled, whereby 2-methyl-3-amino-4,5-dimethylol pyridine is converted to 2-methyl-3-amino-4,5-epoxy-dimethyl-pyridine. The latter can be purified as described in the preceding example, diazotized with sodium nitrite in dilute sulfuric acid, and the diazo compound decomposed by heating at 90° C. Alternatively, the dimethylolaminopyridine compound can be diazotized without purification in the presence of dilute sulfuric acid with similar thermal decomposition. 2-methyl-3-hydroxy-4,5-epoxydimethyl-pyridine is thereby obtained, which yields pyridoxine on hydrolysis as described in Example 1.

Upon substituting an equivalent amount of the mono- or dimethyl ether of 2-butanone-1,4-diol for the 3-ketotetrahydrofuran in Example 1, or by substituting an equimolecular amount of the mono- or dimethyl ether of 2-butyne-1,4-diol for the corresponding acetylenic alcohol in Example 2, the corresponding mono- or dimethyl ether of 2-methyl-3-amino-4,5-dimethylol-pyridine can be obtained by the procedures of the foregoing examples. These compounds can be similarly diazotized and decomposed to the corresponding 2-methyl-3-amino-4,5-dimethylol-pyridine mono- or dimethyl ethers, and the latter hydrolyzed by the procedure indicated in Example 1 for conversion to pyridoxine.

In each of the foregoing procedures, an equivalent amount of α-methyleneaminopropionitrile, or the equivalent amount of α-methylolaminopropionitrile can be substituted for α-methyliminopropionitrile to obtain similar results.

Variations and modifications which will be obvious to those skilled in the art can be made in the procedures hereinbefore described without departing from the scope or spirit of the invention.

I claim:

1. A process for preparing an ether of 2-methyl-3-amino-4,5-dimethylolpyridine, which comprises reacting an ether of 2-butanone-1,4-diol containing 4 to 8 carbon atoms with a member of the group consisting of α-methylimino-, α-methyleneamino- and α-methylolamino-propionitrile at condensation temperature.

2. A process for preparing 2-methyl-3-amino-4,5-dimethylolpyridine, which comprises reacting 2-butanone-1,4-diol with a member of the group consisting of α-methylimino-, α-methyleneamino- and α-methylolamino-propionitrile at condensation temperature.

3. A process for preparing 2-methyl-3-amino-4,5-epoxydimethylpyridine, which comprises reacting 3-ketotetrahydrofuran with α-methyliminopropionitrile at 25° to 100° C. in the presence of piperidine acetate.

4. A process for preparing 2-methyl-3-amino-4,5-epoxydimethylpyridine, which comprises reacting 3-ketotetrahydrofuran with α-methyliminopropionitrile at 25° to 100° C. in the presence of an alkali metal monoethylaniline.

5. A process for preparing 2-methyl-3-amino-4,5-dimethylol-pyridine, which comprises reacting 2-butyne-1,4-diol with a mercuric salt in aqueous medium and with α-methyliminopropionitrile at a temperature from 25° to 100° C.

6. A process for preparing 2-methyl-3-amino-4,5-epoxydimethylpyridine, which comprises reacting 3-ketotetrahydrofuran with a member of the group consisting of α-methylimino-, α-methyleneamino-, and α-methylolamino-propionitrile at a temperature from 25° to 100° C.

References Cited in the file of this patent

UNITED STATES PATENTS

| Number | Name | Date |
|---|---|---|
| 2,272,198 | Harris | Feb. 10, 1942 |
| 2,333,493 | Rigby | Nov. 2, 1943 |